(12) United States Patent
Khatri et al.

(10) Patent No.: US 11,977,640 B2
(45) Date of Patent: May 7, 2024

(54) SYSTEMS AND METHODS FOR AUTHENTICATING THE IDENTITY OF AN INFORMATION HANDLING SYSTEM

(71) Applicant: Dell Products, L.P., Round Rock, TX (US)

(72) Inventors: Mukund P. Khatri, Austin, TX (US); Eugene David Cho, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/372,806

(22) Filed: Jul. 12, 2021

(65) Prior Publication Data

US 2023/0009032 A1  Jan. 12, 2023

(51) Int. Cl.
| | | |
|---|---|---|
| G06F 21/57 | (2013.01) | |
| G06F 21/10 | (2013.01) | |
| G06F 21/33 | (2013.01) | |
| G06F 21/60 | (2013.01) | |
| G06F 21/64 | (2013.01) | |
| G06F 21/73 | (2013.01) | |
| G06Q 30/0645 | (2023.01) | |

(52) U.S. Cl.
CPC ............ *G06F 21/575* (2013.01); *G06F 21/33* (2013.01); *G06F 21/602* (2013.01); *G06F 21/64* (2013.01); *G06F 21/73* (2013.01); *G06Q 30/0645* (2013.01); *G06F 21/107* (2023.08)

(58) Field of Classification Search
CPC ...... G06F 21/575; G06F 21/33; G06F 21/602; G06F 21/64; G06F 21/73; G06F 2221/0751; G06Q 30/0645
See application file for complete search history.

(56) References Cited

U.S. PATENT DOCUMENTS

| | | | | |
|---|---|---|---|---|
| 7,502,942 | B1 * | 3/2009 | Mahmoud | G06F 21/73 |
| | | | | 713/168 |
| 10,311,224 | B1 * | 6/2019 | Farhan | H04L 9/3236 |
| 2004/0103299 | A1 * | 5/2004 | Zimmer | G06F 9/4416 |
| | | | | 713/193 |
| 2004/0255169 | A1 * | 12/2004 | Little | G06F 21/30 |
| | | | | 726/17 |

(Continued)

FOREIGN PATENT DOCUMENTS

CN    111783069 A  *  10/2020

*Primary Examiner* — Shin-Hon (Eric) Chen
*Assistant Examiner* — Ethan V Vo
(74) *Attorney, Agent, or Firm* — Fogarty LLP

(57) ABSTRACT

Systems and methods are provided for validating components of an Information Handling System (IHS). During factory provisioning of the IHS, an owner certificate is stored that specifies an identity of a motherboard installed during manufacture of the IHS. The owner certificate is signed by a certificate authority of an owner of the IHS that retains capabilities for specifying the use of boot code provided by successive renters of the IHS. A renter certificate is also stored that specifies an identity of a chassis to which the motherboard is installed during manufacture of the IHS. Upon a transfer of control or ownership of the IHS, boot code operations by the security processor identify a motherboard and chassis in use by the IHS and utilize the motherboard and chassis certificates to validate that the identified motherboard and chassis are the same motherboard and chassis installed during manufacture of the IHS.

20 Claims, 6 Drawing Sheets

(56) References Cited

U.S. PATENT DOCUMENTS

| | | | | |
|---|---|---|---|---|
| 2009/0262926 | A1* | 10/2009 | Kabra | G06F 21/73 |
| | | | | 707/999.1 |
| 2010/0313011 | A1* | 12/2010 | Laffey | H04L 12/6418 |
| | | | | 713/155 |
| 2013/0290735 | A1* | 10/2013 | Rombouts | H04L 9/3265 |
| | | | | 713/189 |
| 2015/0095631 | A1* | 4/2015 | Rahardjo | G06F 21/445 |
| | | | | 713/2 |
| 2015/0372825 | A1* | 12/2015 | Park | G06F 21/44 |
| | | | | 713/156 |
| 2017/0169250 | A1* | 6/2017 | White | H04L 9/0822 |
| 2019/0073478 | A1* | 3/2019 | Khessib | G06F 13/4282 |
| 2020/0134139 | A1* | 4/2020 | Vaish | G06F 16/1805 |
| 2020/0193065 | A1* | 6/2020 | Smith | H04L 9/3242 |
| 2020/0204380 | A1* | 6/2020 | Laffey | H04L 9/3247 |
| 2020/0313909 | A1* | 10/2020 | Mondello | H04L 9/0866 |
| 2021/0073003 | A1* | 3/2021 | Jacquin | G06F 21/44 |
| 2021/0256133 | A1* | 8/2021 | Beck | H04L 9/0861 |
| 2022/0382872 | A1* | 12/2022 | Sakib | G06Q 30/06 |
| 2022/0382873 | A1* | 12/2022 | Soni | H04L 9/3236 |

* cited by examiner

SYSTEMS AND METHODS FOR AUTHENTICATING THE IDENTITY OF AN INFORMATION HANDLING SYSTEM

FIELD

The present disclosure relates generally to Information Handling Systems (IHSs), and more particularly, to systems and methods for validating the authenticity of an IHS and the components from which the IHS is comprised.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Various embodiments provide security processors installed in an IHS (Information Handling System). The security processors may include: a logic unit; and a memory coupled to the logic unit, the memory having program instructions stored thereon that, upon execution by the logic unit, cause the security processor to: as part of a factory provisioning of the IHS: store a signed owner certificate specifying an identity of a motherboard installed during manufacture of the IHS, wherein the owner certificate is signed by a certificate authority of an owner of the IHS; and store a signed renter certificate specifying an identity of a chassis to which the motherboard is installed during manufacture of the IHS.

In some security processor embodiments, the signed owner certificate comprises a public key of an owner keypair that is derived from immutable specifications of the motherboard of the IHS. In some security processor embodiments, the signed renter certificate comprises a public key of a renter keypair that is derived from immutable specifications of the chassis of the IHS. In some security processor embodiments, upon a transfer of control or ownership of the security processor, the execution of the instructions by the logic unit further causes the security processor to: identify a chassis in use by the IHS and utilize the signed chassis certificate to validate that the identified chassis in use by the IHS is the same chassis to which the motherboard was installed during manufacture of the IHS. In some security processor embodiments, the signed renter certificate obtained during the factory provisioning of the IHS further specifies an identity of a renter of the IHS. In some security processor embodiments, upon a transfer of control or ownership of the security processor, the execution of the instructions by the logic unit further causes the security processor to: identify an entity that has received the transfer of the security processor and utilize the signed renter certificate to validate that the identified entity is the renter specified during the factory provisioning of the IHS. In some security processor embodiments, upon a transfer of control or ownership of the security processor, the execution of the instructions by the logic unit further causes the security processor to: identify a motherboard in use by the IHS and utilize the signed motherboard certificate to validate that the identified motherboard in use by the IHS is the same motherboard installed during manufacture of the IHS. In some security processor embodiments, the immutable specifications of the motherboard comprise unique identifiers of at least one of a processor and a memory device that are each fixed to the motherboard. In some security processor embodiments, the renter certificate is signed by an embedded certificate authority of the security processor. In some security processor embodiments, the identity of the motherboard specified in the signed owner certificate comprises a part number assigned to the motherboard. In some security processor embodiments, the identity of the renter specified in the signed renter certificate comprises a name of a company that contracts for the manufacture of the IHS. In some security processor embodiments, the immutable specifications of the chassis comprise a unique identifier of a memory device that is fixed to the chassis.

In various additional embodiments, memory storage devices include program instructions stored thereon that, upon execution by an Information Handling System (IHS), cause the IHS to: as part of a factory provisioning of the IHS: store a signed owner certificate specifying an identity of a motherboard installed during manufacture of the IHS, wherein the owner certificate is signed by a certificate authority of an owner of the IHS; and store a signed renter certificate specifying an identity of a chassis to which the motherboard is installed during manufacture of the IHS, wherein the renter certificate is signed by an embedded certificate authority of a security processor of the IHS.

In some memory storage devices embodiments, upon a transfer of control or ownership of the IHS, the execution of the instructions by the logic unit further causes the security processor to: identify a chassis in use by the IHS and utilize the signed chassis certificate to validate that the identified chassis in use by the IHS is the same chassis to which the motherboard was installed during manufacture of the IHS. In some memory storage devices embodiments, the signed renter certificate obtained during the factory provisioning of the IHS further specifies an identity of a renter of the IHS and wherein, upon a transfer of control or ownership of the IHS, the execution of the instructions by the logic unit further causes the security processor to: identify an entity that has received the transfer of the security processor and utilize the signed renter certificate to validate that the identified entity is the renter specified during the factory provisioning of the IHS. In some memory storage devices embodiments, upon a transfer of control or ownership of the IHS, the execution of the instructions by the logic unit further causes the security processor to: identify a motherboard in use by the IHS and utilize the signed motherboard certificate to validate that the identified motherboard in use by the IHS is the same motherboard installed during manufacture of the IHS.

In various additional embodiments, methods are provided for validating components of an Information Handling System (IHS). The methods may include: as part of a factory provisioning of the IHS: storing a signed owner certificate specifying an identity of a motherboard installed during manufacture of the IHS, wherein the owner certificate is signed by a certificate authority of an owner of the IHS; and storing a signed renter certificate specifying an identity of a chassis to which the motherboard is installed during manufacture of the IHS, wherein the renter certificate is signed by an embedded certificate authority of a security processor of the IHS.

In some method embodiments, upon a transfer of control or ownership of the IHS, the execution of the instructions by the logic unit further causes the security processor to: identify a chassis in use by the IHS and utilize the signed chassis certificate to validate that the identified chassis in use by the IHS is the same chassis to which the motherboard was installed during manufacture of the IHS. In some method embodiments, upon a transfer of control or ownership of the IHS, the execution of the instructions by the logic unit further causes the security processor to: identify a motherboard in use by the IHS and utilize the signed motherboard certificate to validate that the identified motherboard in use by the IHS is the same motherboard installed during manufacture of the IHS. In some method embodiments, the owner of the IHS comprises a manufacturer of the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
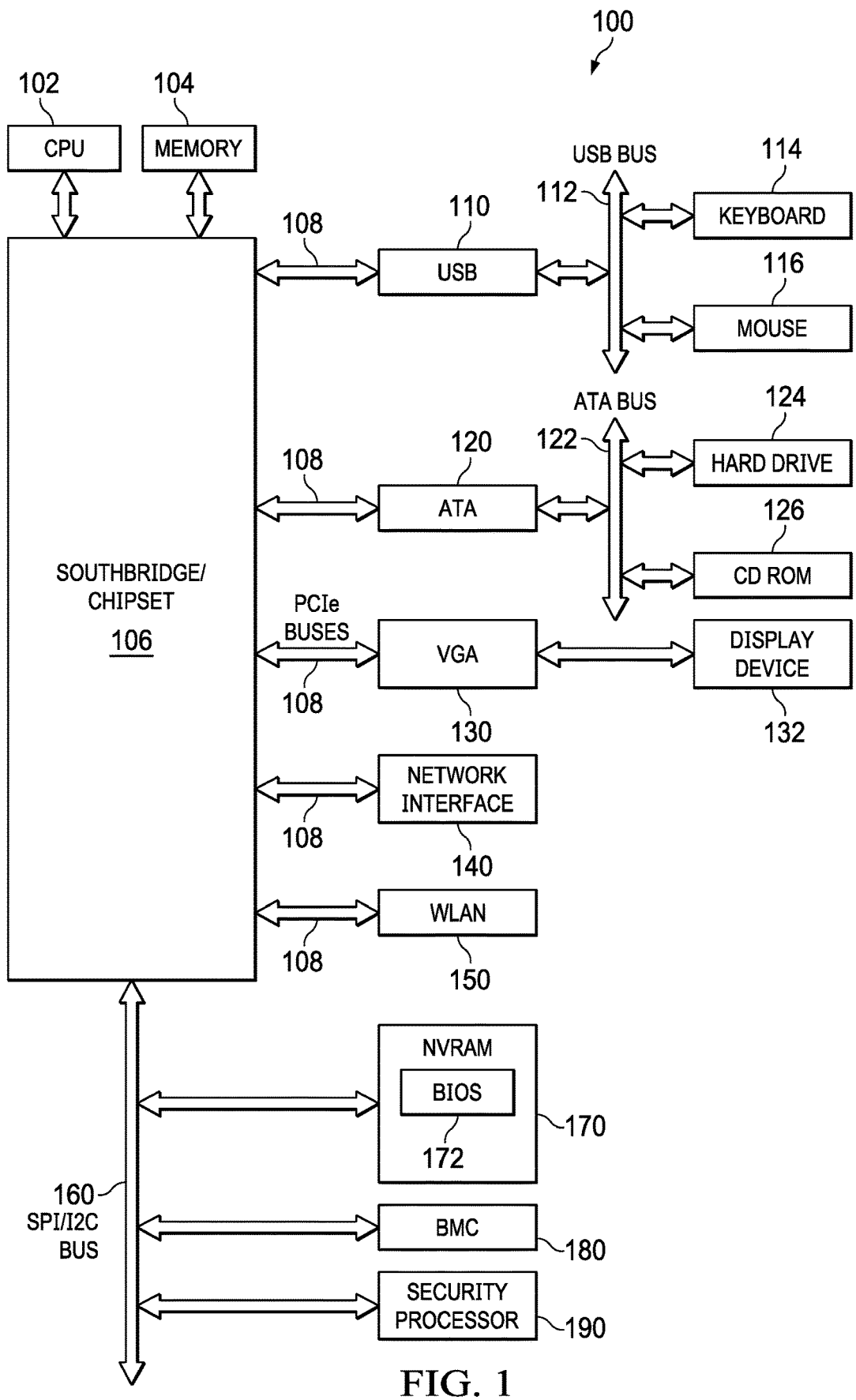
FIG. 1 is a block diagram of an example of hardware components of an Information Handling System (IHS) configured according to some embodiments.

FIG. 1 is a block diagram of an example of hardware components of IHS 100 configured according to some embodiments. As shown, IHS 100 includes processor 102, memory 104, southbridge/chipset 106, one or more Peripheral Component Interconnect-Express (PCIe) buses 108, Universal Serial Bus (USB) controller 110, USB bus 112, keyboard device controller 114, mouse device controller 116, Advanced Technology Attachment (ATA) bus controller 120, ATA bus 122, hard drive device controller 124, compact disk read only memory (CD ROM) device controller 126, Video Graphics Array (VGA) device controller 130, Network Interface Controller (NIC) 140, Wireless Local Area Network (WLAN) controller 150, Serial Peripheral Interface (SPI) bus 160, non-volatile RAM (NVRAM) 170 for storing Basic Input/Output System (BIOS) or Unified Extensible Firmware Interface (UEFI) 172, Baseboard Management Controller (BMC) 180, and security processor 190.

Chipset 106 may be directly connected to an individual endpoint via a PCIe root port within chipset 106 and a point-to-point topology as shown in FIG. 1. BMC 180 may be referred to as a service processor or embedded controller (EC). Capabilities and operations provided by BMC 180 can vary considerably based on the type of IHS 100. For example, the term BMC is often used to describe an embedded processor included in a server, while an EC is more likely to be found in a consumer-level device. Moreover, an EC included in a data storage system may be referred to as a storage enclosure processor. As disclosed herein, BMC 180 represents a processing device different from CPU 102, which provides various management operations for IHS 100. For example, an EC may be responsible for power management, cooling management, and the like. Moreover, BMC 180 may be configured to provide out-of-band access to devices at IHS 100. As used herein, out-of-band access herein refers to operations performed prior to execution of BIOS 172 by processor 102 to initialize operation of IHS 100.

IHS 100 may include additional processors that are configured to provide localized or specific control operations, such as a battery management controller. Bus 160 may include one or more busses, including a SPI bus, an I²C bus, a system management bus (SMBUS), a power management bus (PMBUS), and the like.

BIOS 172 may be referred to as a firmware image. BIOS 172 includes instructions executable by CPU 102 to initialize and test the hardware components of IHS 100, and to load a boot loader or an operating system (OS) from a mass storage device. BIOS 172 additionally provides an abstraction layer for the hardware, such as a consistent way for application programs and OSs to interact with the keyboard, display, and other input/output devices. When power is first applied to IHS 100, IHS 100 begins a sequence of initialization procedures. During the initialization sequence, also referred to as a boot sequence, components of IHS 100 are configured and enabled for operation, and device drivers can be installed. Device drivers provide an interface through which other components of IHS 100 can communicate with a corresponding device. As described in additional detail below, the boot sequence that is utilized by IHS 100 may include procedures that validate the authenticity of the motherboard and chassis of the IHS as being the same motherboard and chassis that were installed during manufacture of the IHS.

IHS 100 may include multiple processor cores, audio devices, and the like. While a particular arrangement of bus technologies and interconnections is illustrated for the purpose of example, a person of ordinary skill in the art will appreciate that the techniques disclosed herein are applicable to other IHS architectures. IHS 100 may include multiple CPUs and redundant bus controllers. One or more components may be integrated together. For example, portions of southbridge/chipset 106 may be integrated within CPU 102.

Additional components of IHS 100 may include one or more storage devices that can store machine-executable code, one or more communications ports for communicating with external devices, and various I/O devices, such as a keyboard, a mouse, and a video display. An example of IHS 100 includes a multi-tenant chassis system where groups of tenants (users) share a common chassis, and tenant has a unique set of resources assigned thereto. The resources can include blade servers of the chassis, I/O modules, PCIe cards, storage controllers, and the like. IHS 100 may include a set of instructions that can be executed to cause it to perform any one or more of the methods or computer-based operations disclosed herein. IHS 100 may operate as a standalone device or may be connected to other computer systems or peripheral devices, such as by a network.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, IHS 100 may be implemented using electronic devices that provide voice, video, or data communication.

IHS 100 may include a disk drive unit and may include a computer-readable medium in which one or more sets of instructions, such as software, can be embedded. Further, the instructions may implement one or more of the methods described herein. In a particular embodiment, these instructions may reside completely, or at least partially, within memory 104 or another memory included in IHS 100, and/or within CPU 102 during execution by IHS 100. System memory 104 and CPU 102 also may include computer-readable media.

Security processor 190 may be used to establish a hardware Root of Trust (RoT) within components of IHS 100. As used herein, the term RoT generally refers to one or more hardware components that operate using instructions that have been validated with regard to their authenticity and/or integrity. In the described embodiments, security processor 190 may implement boot processes that operate using code from an immutable source. Because the anchor for the root of trust is established by the security processor 190 using immutable source code, the root of trust cannot be modified by unauthorized parties. Upon the IHS being booted, the security processor 190 executes self-tests and validation of its own firmware. If these tests pass, security processor 190 may then validate additional code to be used by the security processor or by other components of the IHS, thus expanding the root of trust. As described below, when security processor 190 is initialized during factory provisioning, it may utilize code within the established root of trust in order to derive one or more internal keys from device identity inputs, where these keys may be used once the IHS has been deployed in the validation of various hardware and software components of the IHS In existing systems, some of the capabilities of security processor 190 may be fulfilled by a Trusted Platform Module (TPM). The TPM is a hardware component used to help securely store keys and measurements that verify the integrity of the system. Although computer programs may use a TPM to authenticate hardware devices, the firmware instructions that are used by a TPM are not programmable or customizable. In contrast with existing TPMs, when IHS 100 is powered up, security processor 190 executes firmware instructions located in an embedded read-only memory of the security processor. During its fabrication, one more protected memory devices that are accessible by security processor 190 are programmed with immutable code, sometimes known as the boot ROM, that may be trusted implicitly, but that may also be expressly validated using a provided reference signature. In some instances, security processor 190 may run a Memory Built-In Self-Test (MBIST) on every boot to ensure that memory used by the processor in establishing the root of trust (including the boot ROM) has not been tampered with. If the integrity of the boot code is confirmed, security processor 190 may load the boot code firmware from memory.

Figure 2:
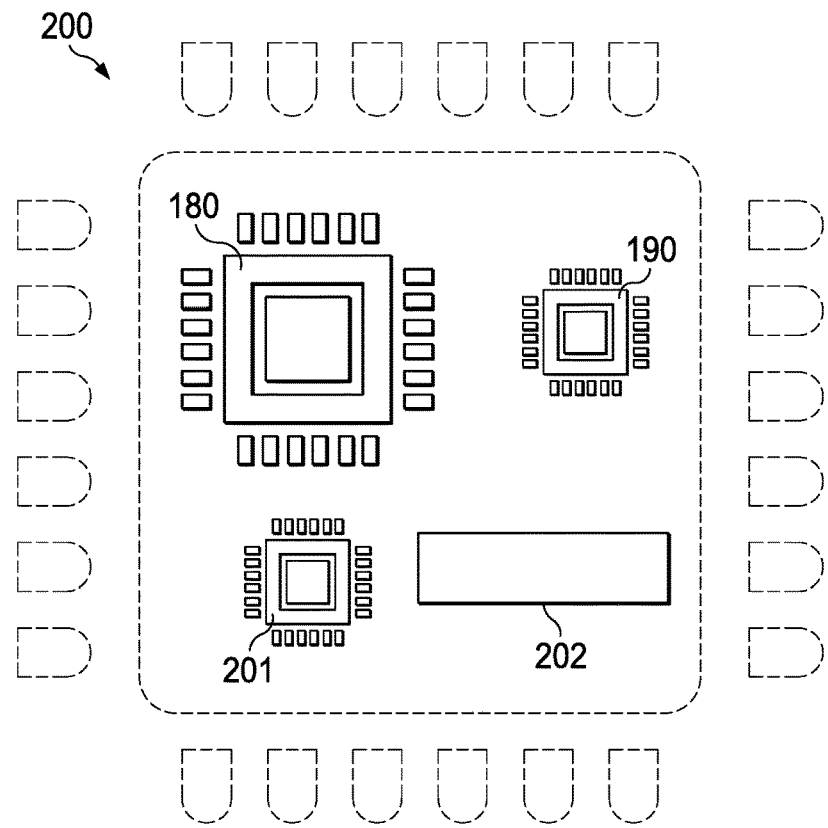
FIG. 2 is a diagram of a chip comprising a security processor, according to some embodiments.

FIG. 2 is a diagram of an example of security chip 200 comprising security processor 190, according to some embodiments. As illustrated, chip 200 may be coupled (e.g., soldered) to a motherboard hosting other components of IHS 100 (e.g., CPU 102, etc.). Security chip 200 may include security processor or core 190, BMC 180, offload CPU or hardware accelerator 201, and MROM 202 containing immutable code. In different implementations, security chip 200 may be manufactured as a Systems-On-Chip (SoC), Field-Programmable Gate Array (FPGA), Application-Specific Integrated Circuit (ASIC), Complex Programmable Logic Device (CPLD), or the like.

Figure 3:
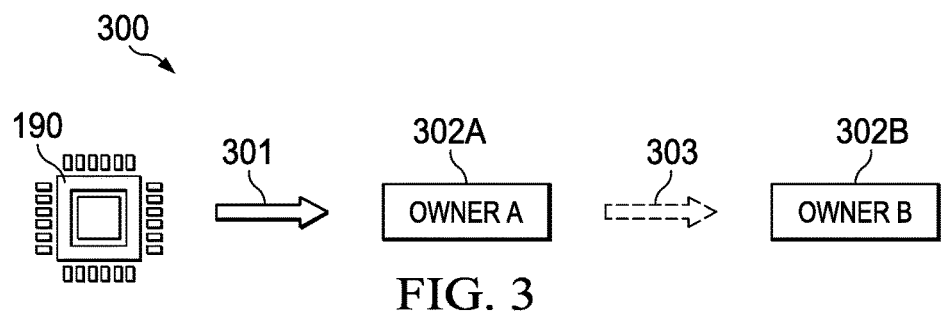
FIG. 3 is a diagram of an example of a unidirectional chain of control of a security processor, chip, or IHS, according to some embodiments.

FIG. 3 is a diagram of an example of a unidirectional chain of control 300 of security processor 190, chip 200, and/or IHS 100, according to some embodiments. In chain 300, security processor 190 may be manufactured and customized by a chip manufacturer and transported, in operation 301, to first owner 302A. Once security processor 190 reaches first owner 302A, it stays under control of that entity until first owner 302A transfers security processor 190 to second owner 302B in transaction 303. As part of transaction 303 first owner 302A revokes its ability to control security processor 190 in favor of second owner 302B, including the ability to execute code stored therein, so that only one entity at a time, typically the entity with possession of security processor 190, has control over its firmware, encryptions keys, certificates, etc.

In some cases, first owner 302A may be an Original Equipment Manufacturer (OEM) or IHS manufacturer. In some cases, first owner 302A may be a manufacturer of a printed circuit board assembly (PCBA) or motherboard of the IHS, where the manufacturer has purchased a security chip and installed it on the PCBA. Second owner 302B may be a customer of the OEM entity, or a business, brand or technical group within the OEM entity. In some scenarios, first owner 302A may manufacture and provision an IHS specifically for second owner 302B according to provided specifications.

Here it should be noted that unidirectional chain of control 300 presents several challenges to the OEM's supply chain, such as when first owner 302A is committed to accepting product returns (e.g., followed by repurposing of IHS 100), warranty claims, and/or service calls from second owner 302B. Specifically, in chain of control 300, first owner 302A must rely upon second owner 302B putting first owner 302A back in control of security processor 190 prior to physically shipping IHS 100 to owner 302A, which may not always happen.

Figure 4:
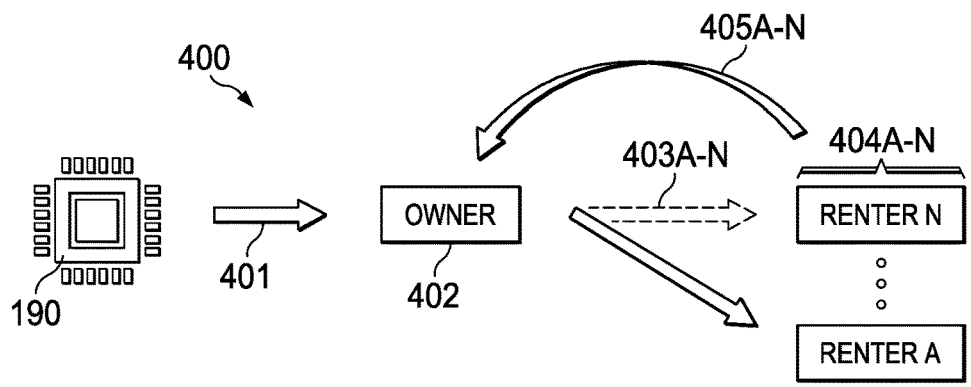
FIG. 4 is a diagram of an example of a bidirectional chain of control of a security processor, chip, or IHS, according to some embodiments.

In contrast with unidirectional chain of control 300, FIG. 4 is a diagram of an example of bidirectional chain of control 400 of security processor 190, chip 200, or IHS 100, according to some embodiments. Particularly, security processor 190 may be customized by a chip manufacturer and transported in operation 401 to owner 402 (e.g., an OEM). Once security processor 190 reaches owner 402, it stays under control of owner 402 until it transfers security processor 190 to renter 404A (e.g., a customer or brand of the OEM) in connection with transaction 403A (e.g., a sale, license, lease, assignment, etc.).

After transaction 403A, however, owner 402 may continue to maintain some restricted form of access to security processor 190, in a manner that reduces or minimizes the potential exposure to renters 404A-N, for example, in the event that owner 402's keys leak while security processor 190 is in the possession of renters 404A-N. As such, when renter 404A returns security processor 190 to owner 402, even in cases where renter 404A does not put owner 402 back in control of security processor 190 prior to shipping IHS 100 to owner 402 in transaction 405A, owner 402 may still exercise some restricted form of control over security processor 190 (e.g., with access to fuse controller but without access to USB, storage, network controllers, etc.) sufficient to evict previous renter 404A's code and to install new renter 404B (e.g., another customer of the OEM entity, etc.) firmware in security processor 190 prior to shipping IHS 100 in transaction 403B.

Figure 5:
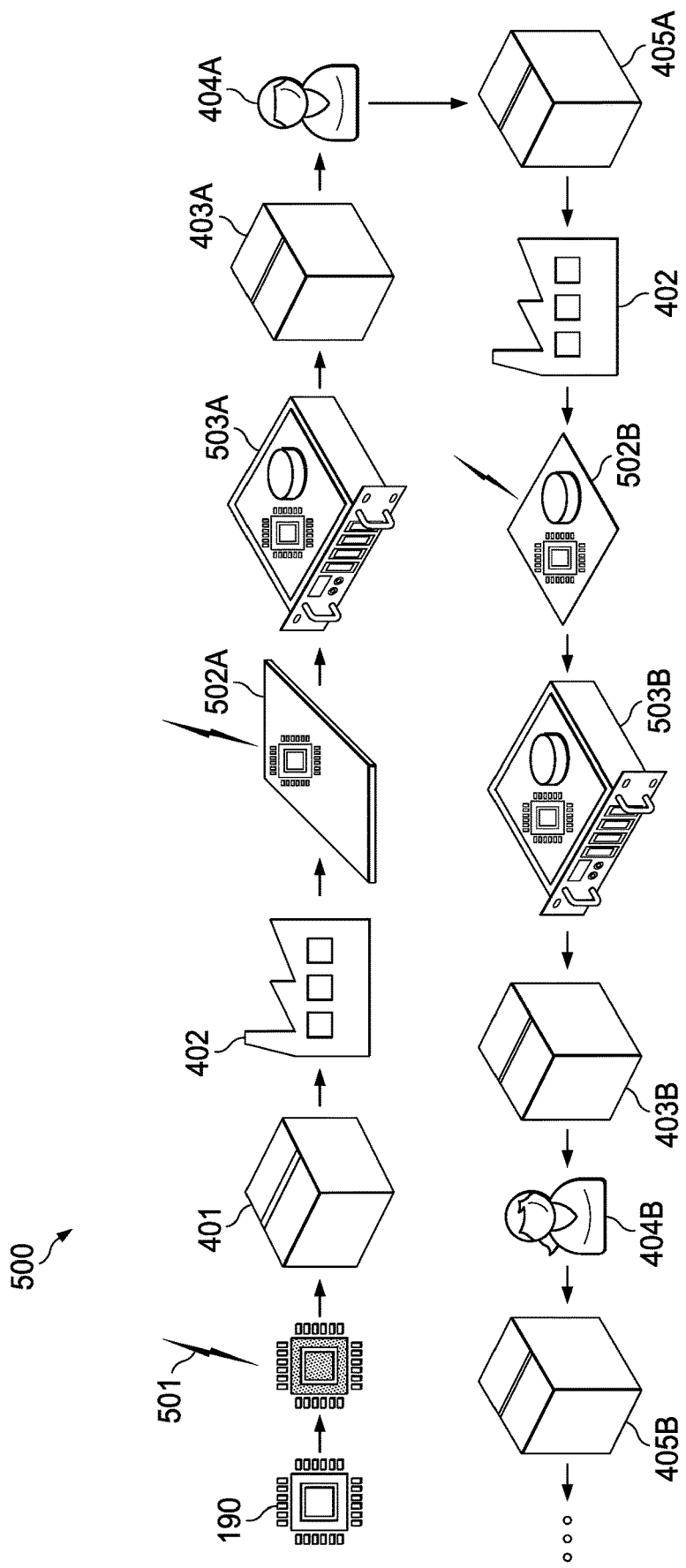
FIG. 5 is a diagram of examples of various supply chain operations involved in the lifecycle of a security processor, chip, or IHS, according to some embodiments.

FIG. 5 is a diagram illustrating examples of various supply chain operations 500 involved in the management of control of security processor 190, chip 200, and/or IHS 100, according to some embodiments. Specifically, security processor 190 may be provisioned 501 for owner 402 (e.g., OEM entity, or manufacturer of IHS 100) by a chip manufacturer and shipped 401 to owner 402. In 502A, owner 402 uses its restricted control over security processor 190 (e.g., where access is excluded from USB, network, and storage controllers) to fuse one or more keys or the like therein, and/or to store code therein that belongs to renter 404A.

In 503A, IHS 100 is assembled, provisioned and tested by owner 402, and then shipped 403A to renter 404A. As described with regard to the below embodiments, factory provisioning of the IHS 100 may include operations by a security processor of the IHS that generate cryptographic certificates that validate the identity of the motherboard installed in the IHS 100 and that also validate the chassis from which the IHS 100 was assembled. Once the owner 402 transfers possession of the IHS 100 to renter 404A, boot code instructions, that may be provided by the renter, are used to validate the authenticity of the motherboard and chassis as being the same motherboard and chassis from which the IHS 100 was manufactured and delivered to the renter 404A.

In some scenarios, renter 404A returns 405A IHS 100 to owner 402, for example, in connection with a return, warranty claim, or service request. In 502B, owner 402 evicts renter 404A from security processor 190, for example, by incrementing the value(s) one of one or more irreversible pointers or counters within security processor 190, where these counters specify the boot code and encryption keys that will be used by security processor, thus providing a subsequent renter 404B with exclusive control over security processor 190. In 503B, IHS 100 is updated, re-assembled, provisioned and tested by owner 402. In provisioning IHS 100, owner 402 may use its restricted control over security processor 190 to fuse one or more keys or the like and/or to store code therein that belongs to another renter 404B. IHS 100 is shipped 403B to renter 404B, who may also eventually return 405B IHS 100 to owner 402, and so on.

Figure 6:
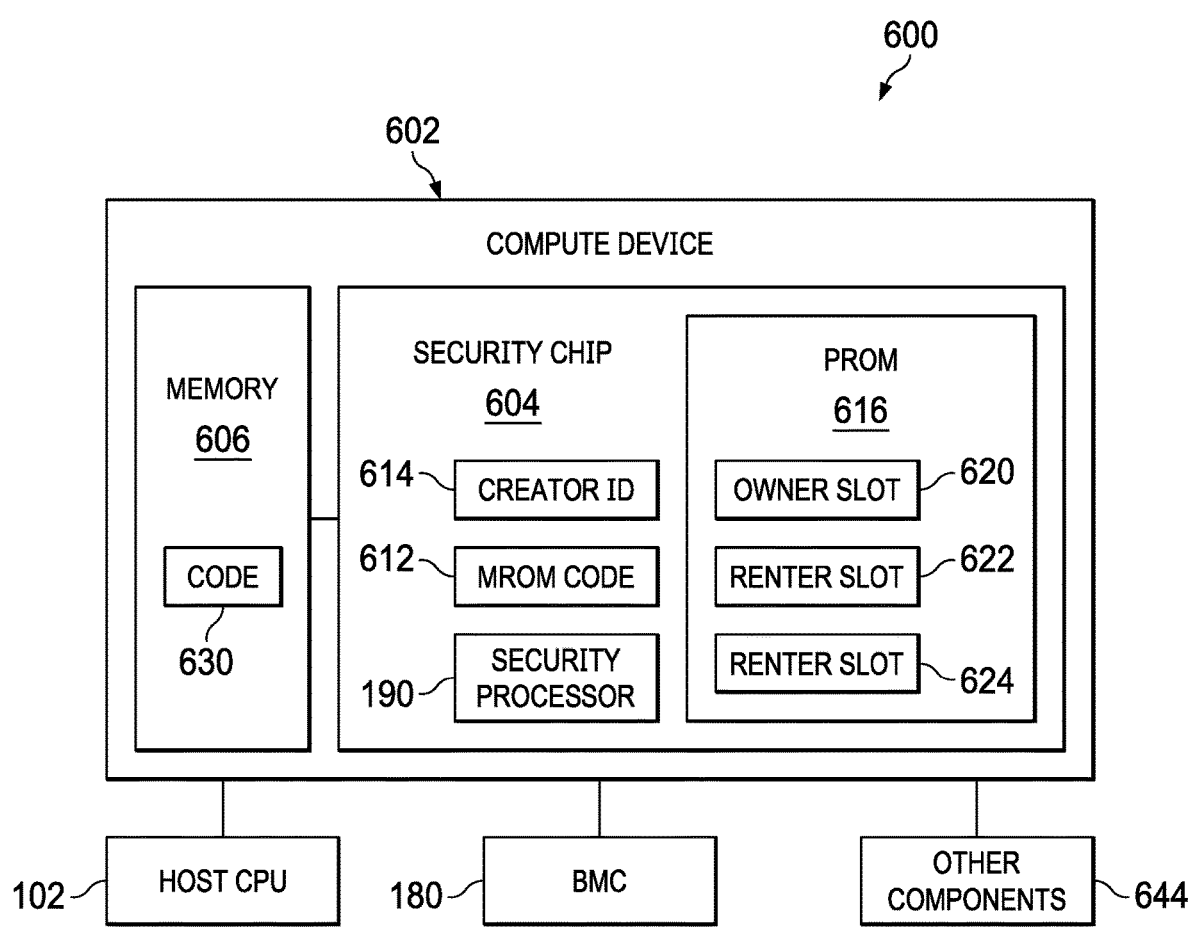
FIG. 6 is a diagram of an example of a compute device, according to some embodiments.

FIG. 6 is a diagram of an example of a portion of compute device 602 of IHS 600, according to some embodiments. IHS 600 may be any suitable system, such as IHS 100 of FIG. 1. Compute device 602 includes security chip 604 (e.g., chip 200) and memory 606. In an example, security chip 604 may be a System-on-a-Chip (SoC). In other examples, however, security chip 604 may be any suitable security chip with a processor or controller 190 and customizable instructions including. As illustrated, security chip 604 may include a security processor 190, Mask Read-Only Memory (MROM) code 612, security chip ID 614, and Programmable Read-Only Memory (PROM) 614. In an example, PROM 616 includes one-time programmable memory locations or slots to store any suitable data associated with security chip 604, such as the identity keys and certificates described in additional detail below. Memory 606 may be any suitable type of flash memory including, but not limited to, an electronically erasable programmable read-only memory. Memory 606 may be utilized to store one or more sets of code 630 that may be retrieved and executed by security processor 190, where this code may include owner boot code or renter boot code. Code 630 may be stored in any suitable location including, but not limited to, memory 606. Code 630 may be written in memory 606 in any suitable manner including, but not limited to, through the use of add-on chip that interfaces with security chip 604 that writes code 630 into the memory 606.

Other components 644 may include any suitable components of compute device 602 including, but not limited to, a Graphics Processing Unit (GPU), a host bus adaptor, a cryptography offload device, a power supply unit, and a network interface card. In some embodiments of the systems and methods described herein, compute device 602, via security chip 604, may perform any suitable operation including, but not limited to, the operations disclosed herein. In other embodiments, compute device 602 may include additional components without varying from the scope of this disclosure.

As described, a chip manufacturer or silicon creator may manufacture security chip 604 in a variety of manners, such as an SoC. During the manufacture of security chip 604, the chip manufacturer may program, write, burn, or otherwise permanently store data within the silicon of the PROM 616 of the security chip. Also during manufacture of security chip 604, MROM code 612 may be programmed with hardwired instructions and data, such that the MROM contents cannot be changed any further after this programming by the manufacturer of the security chip. In some instances, the security chip manufacturer may also store or burn a unique security chip identification (ID) 614 within the silicon of each security chip 604. As described in additional detail below, in some embodiments, this security chip ID 614 may be utilized by a renter receiving control of an IHS, and consequently of the security chip 604, to validate the authenticity of the security chip 604 as the same chip that was installed in the IHS during its manufacture.

In some embodiments, the security chip or IHS manufacturer may store an owner ID within owner slot 620 of the PROM 616 of the security chip 604. In an example, the owner ID stored within owner slot 620 during manufacture and provisioning may be a public key for use in authenticating boot code 630 stored within memory 606 of the IHS. Additional data may be stored within owner slot 620 including a hidden root key (HRK), boot keys, and identity keys. HRK may be a symmetric key utilized for local encryption and decryption by security chip 604. Secure boot keys may be utilized by the security processor to sign code and/or certificates. As described in additional detail below, identity keys may be utilized to support proof-of-identity challenges for establishing the authenticity of the IHS and components from which it has been manufactured.

The term "secure boot," as used herein, refers to capabilities developed to assure that an IHS boots using only trusted software. "Booting" refers to a chain of events that starts with execution of hardware-based procedures and then hands-off to firmware and software loaded into a memory, and it may involve processes such as one or more of: self-tests, the loading of configuration settings, and/or the loading of one or more of a BIOS, a hypervisor, an OS, or the like.

In various supported secure boot modes, once IHS 100 is initialized, security processor 190 validates signatures for boot code that is loaded and utilized and thus iteratively expands a root of trust by validating signatures of additional instructions that are loaded, including UEFI firmware drivers (also known as Option ROMs), EFI applications, and procedures for booting an OS. As described in additional detail below, embodiments may support boot code procedures that validate the authenticity of the chassis and/or motherboard of the IHS as being the same chassis and/or motherboard that was installed during manufacture of the IHS. If the motherboard and chassis are determined to be authentic and software signatures for the boot code are validated, IHS 100 boots, and security processor 190 gives control of the IHS to the entity (e.g., owner or renter) in control of the IHS, where the provided amount of control is commensurate with the type of secure boot authorized for the entity (e.g., based on the type of controlling entity, owner 402 or renter 404A-N). The procedures for determining whether control of the IHS is to be granted to an owner or renter and for loading the appropriate boot code for the entity controlling the IHS are described in co-pending application Ser. No. 17/372,619 that is incorporated by reference herein in its entirety. In scenarios where the controlling entity, such as an OEM, is an owner, the boot code may load instructions for further provisioning of the IHS, such as loading and validating additional firmware 630 and creating additional secure boot keys that are stored in security processor 190. Security chip 604 may utilize keys stored in owner slot 620 of a PROM 616 to authenticate code 630 that is associated with the owner entity. Upon code 630 being authenticated using keys from owner slot 620, the owner entity may execute the code 630 to perform operations including, but not limited to, verifying other devices in IHS 600 that are directly attached to security chip 604 including, but not limited to, host CPU 102, BMC 180, and other components 244. Additional owner boot code executed by security processor 190 may further provision the IHS for delivery to a renter.

In some existing scenarios, an IHS may be manufactured and provisioned by an owner specifically for a particular renter. Upon delivery of these existing IHSs, the renter is able to install software and hardware of their choosing on the IHS, but the renter must rely on software provided by the owner to establish and maintain a root of trust on the IHS. This compromises any ability for end users/customers to have total control of the IHS, since the renter relies on firmware, identity information, and encryption keys provided by the owner. Embodiments of the co-pending applications specified above provide capabilities by which exclusive control of an IHS may be granted to successive renters of the IHS without compromising the supply-chain security of the IHS manufacturer. Depending on the entity controlling the IHS, boot code for the controlling entity is identified and encryption keys for the controlling entity are retrieved from the appropriate owner or renter slot 620, 622, 624 of the PROM 616 of the security chip. When the IHS is in possession of an owner, code 630 that can be accessed using keys stored in owner slot 620 may be used to create and remove renters by programming and invalidating renter slots 622, 624 within PROM 616. When the IHS is in possession of a renter, code 630 that can be accessed using keys stored in the slot 622, 624 corresponding to the renter may be used by the security processor 190 to establish a root of trust using boot code and other instructions provided by the renter, thus allowing renters to independently establish their own root of trust in the IHS.

These capabilities for exclusive use of owner or renter boot code may be utilized by embodiments described herein to provide renters with the ability to validate that an IHS includes the same motherboard and chassis from which the IHS was manufactured and provisioned by the owner. As described in additional detail below, during factory provisioning of an IHS, keys in owner slot 620 may be used to access owner boot code that is used to obtain digital certificates that establish the identities of the motherboard and chassis installed during manufacture of the IHS. Once the IHS has been delivered to the renter, the keys in renter slots 622 or 624 may be used to access renter boot code that utilizes these digital certificates in validating the authenticity of the detected motherboard and chassis of the IHS, thus providing the renter with assurances that these components of the IHS are genuine and provide a suitable platform for establishing their own root of trust in the IHS.

Figure 7:
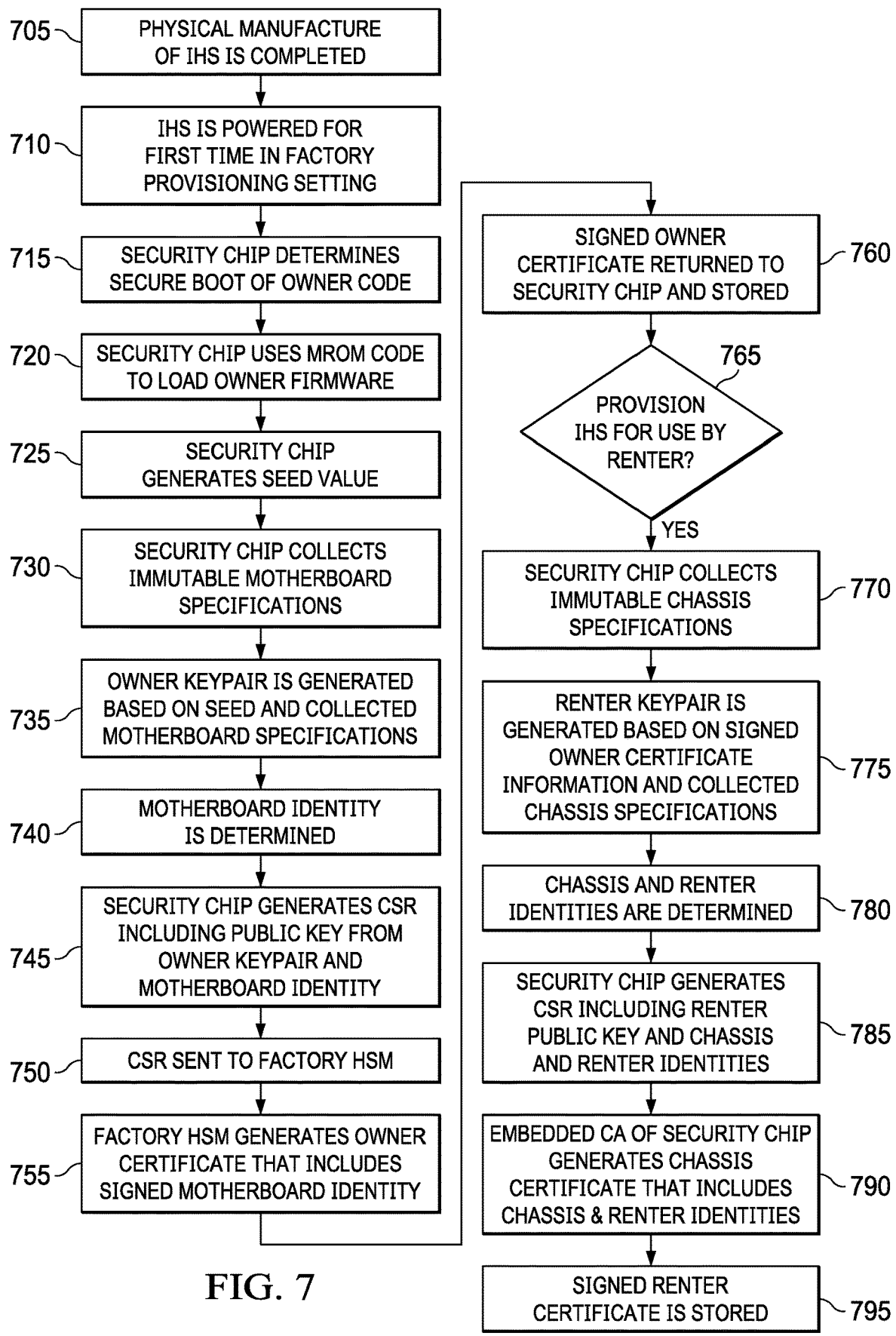
FIG. 7 is a flowchart of an example, according to some embodiments, of a method for manufacturer provisioning of an IHS in a manner that supports validation of the authenticity of the IHS and its components.

FIG. 7 is a flowchart of an example, according to some embodiments, of a method for manufacturer provisioning of an IHS in a manner that supports validation of the identity of the IHS and its components. Embodiments may begin, at 705, with the completion of the physical manufacture of an IHS, such as described above. In particular, an IHS may be manufactured such that it includes a security chip, such as described with regard to FIGS. 2 and 6, that includes a security processor that is configurable to execute boot code for an owner of the IHS or for successive renters of the IHS.

The manufacture of an IHS may be completed at one or more facilities and may involve various stages. In some instances, an IHS may be assembled according to specifications provided by a renter that has contracted for manufacture and delivery of an IHS. In other instances, an IHS may be assembled according to a base specification that, in some cases, may then adapted for the needs of a particular renter. For example, in embodiments where an IHS is a rack-mounted server, a motherboard of the IHS may be assembled or purchased according to a base specification. This standard motherboard may then be installed within a server chassis that is customized with various components requested by a specific customer, such as storage controllers, storage drives, network cards, etc. The physical manufacture of an IHS may be completed at a single facility, or may include manufacturing steps conducted at several different facilities.

Once the physical manufacture of an IHS is completed such that all permanent hardware components have been fixed to the IHS, at 710, the IHS may be powered for the very first time in a factory provisioning setting. In some instances, this factory provisioning setting may be a facility that is co-located with the factory at which the IHS was manufactured. In other instances, this factory provisioning setting may be a separate facility that is operated by the manufacturer of the IHS, or by an entity that has been contracted to provide provisioning services by the manufacturer of the IHS. In all instances, the factory provisioning setting may be a secure facility that implements procedures that eliminate any opportunities for a malicious actor to gain access to an IHS, whether physical access or remote access, while the IHS is being provisioned.

When initially powered at a factory provisioning setting, at 720, the initial boot code that is executed serves to initialize a security chip of the IHS according to instructions provided by the owner of the IHS, such as instructions encoded within an MROM that is accessible by a security processor of the security chip. As described above, embodiments may support capabilities for the security processor to execute boot code instructions provided by the owner of an IHS, or to instead execute boot code provided by a renter of the IHS, where the operation of these different sets of boot code instructions may be mutually exclusive, thus providing both the owner and renter of the IHS with separate assurances that the IHS is being booted and initialized using only instructions provided by the owner or by a specific renter. In some embodiments, the initial boot code instructions used to determine whether to load either owner boot code or boot code provided by a renter may be programmed during manufacture of the IHS within an MROM that is permanently fixed to a motherboard or security chip of the IHS. In the embodiment of FIG. 7, this initial boot code in the MROM determines, at 720, that owner boot code will be loaded and used in the initial operation and provisioning of the IHS.

According to owner boot instructions that are retrieved from the MROM, the security processor may retrieve and validate firmware instructions for use by the security processor against a reference signature for these firmware instructions, where the reference signature may have been permanently encoded within the PROM of the security chip, or within another memory, during manufacture of the IHS. If the retrieved firmware is successfully validated, it may be loaded and executed by the security processor, such that the security processor is assured to be using authentic instructions and also serving to establish an initial root of trust in the security processor. At 725, retrieved owner boot code may be executed by the security processor in generating one or more encryption secrets, such as random seed values, that may utilized in the generation of the identity key pairs described herein.

Using retrieved owner code, at 730, the security processor collects specifications that uniquely identify the motherboard of the IHS, where the collected specifications are immutable and unique characteristics of the motherboard. In some embodiments, the security processor may retrieve a unique value this is encoded by each of the system processors that are coupled to the motherboard of the IHS. In such instances, the owner code executed by the security processor may include instructions for retrieving a unique and immutable identifier from the main processor, where this identifier of the processor is only accessible during pre-boot operations and is not otherwise made available by the processor. In the same manner, the security chip may use owner code to retrieve unique and immutable identifiers used by memory devices that are permanently fixed to the motherboard, such as a unique identifier of a SPI flash memory device that is soldered to the motherboard and is used to store boot code. In some embodiments, the security processor may use owner boot code to collect other immutable characteristics of a motherboard, such as a data structure that is populated with indications specifying whether motherboard components are detected as being coupled to specific GPIO pins supported by the motherboard.

After the immutable specifications of the motherboard have been collected, at 735, the security processor generates a cryptographic key pair for use by the owner and renters of the IHS in validating the identity of the motherboard. As described above, a security processor according to embodiments may support various cryptographic capabilities that may be enabled through the use of owner boot code, such as key pair generation. In these embodiments, the security processor may utilize the previously generated seed value and the immutable specifications of the motherboard as unique values from which a key pair is generated. Once the key pair is generated, the security processor may permanently store the private key of this key pair, along with other keys, within slots of a PROM of the security chip, such as described above.

In the illustrated embodiment, provisioning of the IHS continues, at 740, with the security processor determining the identity of the motherboard installed in the IHS. Whereas the previously described immutable specifications of the motherboard are unique characteristics that are not accessible by post-boot software applications, such as operating system programs or programs operating on other components of the IHS, the identity of the motherboard is an externally verifiable identifier of this motherboard, where such motherboard identity values may or may not be unique values. In some embodiments, the motherboard identity may be a part number assigned by the manufacturer of the motherboard, or by the manufacturer of the IHS. In some embodiments, the motherboard identity may additionally or alternatively be an identifier specifying the facility at which the motherboard with manufactured. Other embodiments may utilize various other sources of information that may be used to identify the motherboard.

As indicated at 745, the security processor generates a CSR (certificate signing request) that requests a digital certificate, where this certificate will be usable to validate the identity of the motherboard once the IHS has been put into operation, such as by a renter. The security processor includes the public key of the generated owner keypair in the CSR, thus requesting a digital certificate to be issued for use of this public key of the owner keypair. The security processor additionally includes the motherboard identity in the CSR, such as the collected part number or other identifier of the motherboard. In some embodiments, in addition to including the motherboard identity in the CSR, the security processor may additionally include identity information for the security processor itself in the CSR. In some embodiments, the identity information included in the CSR may further include an identity, such as a part number, of the main processor(s) of the IHS.

At 750, the CSR generated by the security processor may be submitted to a certificate authority (CA) that operates within the factory provisioning setting. In some embodiments, this CA may be a factory HSM (hardware security module) that operates in the factory provisioning setting and manages cryptographic operations and information on behalf of the manufacturer of the IHS. The CA capabilities of the HSM may thus be utilized, at 755, to generate the requested digital certificate. In generating the certificate, in some embodiments, the HSM may validate the public key from the owner keypair by issuing a cryptographic public key verification to the security processor. In response, security chip uses the private key of the owner key pair to establish exclusive use of the public key from the owner key pair in encrypted, public-key communications. In addition to validating the public key from the CSR, the HSM may also generate a digital signature of the motherboard identity information, and any other identity information, that is also included in the CSR. The validated public key from the owner keypair and the digital signature are included in the certificate generated by the HSM. At 760, the generated certificate, referred to herein as an owner certificate, is returned to the security chip, where it is stored according to instructions provided in the owner boot code being run by the security chip. As described in additional detail with regard to FIG. 8, the stored owner certificate may be retrieved and used to validate the authenticity of the motherboard as being the same motherboard installed during manufacture of the IHS and provisioned as described herein.

As described above, an entity designated as the owner of an IHS may be provided with the ability to assign exclusive use of a security chip to successive renters of the IHS, such that each renter can establish their own root of trust in the hardware of the IHS. Accordingly, the factory provisioning of an IHS may include provisioning of the IHS for use by a renter. During manufacture of the IHS, a motherboard is installed within a chassis of the IHS. As described, the motherboard may be identified through various immutable specifications. In some cases, large quantities of such motherboards may be manufactured identically. Once the motherboard is installed within a chassis, various components may be fixed to the chassis in customizing the IHS for use by a particular renter, or for a particular application, such as customizing a rack-mounted server for data warehouse operations. In some scenarios, additional components may be alternatively or additionally fixed to the motherboard in customizing the IHS for use by a particular renter, or for a particular application. In some scenarios, a particular type or model of chassis may be selected during manufacture for use by a particular renter. As with the validation of the motherboard identity, embodiments support capabilities for validating the identity of these chassis components that have been installed during manufacture of the IHS, in some cases according to specifications provided by a particular renter that has contracted for manufacture of the IHS.

As indicated in FIG. 7, factory provisioning may continue, at 765, with the determination whether to continue with provisioning the IHS for use by renter, where the identity of the renter may be known or unknown. If provisioning the IHS for a renter, the owner boot code instructions executed by the security chip may continue, at 770, with the collection of immutable chassis specifications. As with the immutable specifications of the motherboard described above, the security chip may collect immutable and preferably nonpublic unique identifiers from the chassis of the IHS. In some embodiments, unique identifiers for the chassis may be provided through queries to a SPI flash memory that is permanently fixed to the chassis. Other embodiments may obtain unique identifiers for the chassis from a chassis management controller, or from a specialized backplane that has been installed in the chassis of a rack-mounted server. Other embodiments may obtain unique identifiers for the chassis based on queries to verify the installation of components to selected GPIO pins supported by the chassis management controller and/or by a backplane.

Embodiments may continue, at 775, with the cryptographic capabilities of the security processor being utilized to generate an additional key pair, referred to herein as a renter key pair. In some embodiments, the renter key pair may be generated based on the immutable unique identifiers of the chassis that are collected by the security chip. In some embodiments, the generation of the renter key pair may also be based on information included in the owner certificate, such as the digital signature. As with the owner key pair, the private key of the renter key pair may be stored to a one-time programmable memory, PROM, of the security chip.

In some embodiments, the renter provisioning may continue, at 780, with the security processor, still utilizing retrieved owner boot code, collecting information specifying the identity of the chassis. In some embodiments, the chassis identifier may be a part number that may be obtained from a persistent memory device supported by the chassis, or by a chassis management controller that has been installed to the IHS, or by a backplane installed in the chassis. As with the identifiers of the motherboard that were included in the owner certificate, the identifiers collected for the chassis are externally verifiable identifiers.

Embodiments may continue, at 785, with the security chip generating a CSR that requests an additional digital certificate, where this certificate will be usable to validate the identity of the chassis once the IHS has been put into operation by a renter. The security processor includes the public key of the generated renter keypair in the CSR, thus requesting a digital certificate that is issued for validated use of this public key of the renter keypair. The security processor additionally includes the chassis identity in the CSR, such as the collected part number of the chassis, and such as other chassis identifiers of a chassis management controller and/or of a backplane.

Whereas the CSR for the owner certificate is submitted to the factory provisioning HSM, the CSR for establishing the chassis identity is signed by the cryptographic capabilities of the security processor. As described above, the security processor may include capabilities that allow the processor to operate as an embedded certificate authority (CA) capable of generating, signing and issuing digital certificates. Accordingly, at 790, the embedded CA of the security chip generates a digital certificate, referred to herein as a renter certificate, that validates the authenticity of the public key of the renter key pair and that also includes a digital signature of the identity information for the chassis that is to be included in the body of the certificate. Whereas the owner certificate is signed using a private key of the factory CA, the renter certificate may be signed using the private key of the owner key pair. As described in additional detail below, when signed in this manner, the validity of the renter certificate may be confirmed by the security processor, through operations by the embedded CA, once the IHS is provisioned and deployed by a renter. In some embodiments, the renter certificate may be additionally or alternatively signed by the factory CA. At 795, the generated renter certificate is stored according to owner boot code instructions executed by the security processor. With the generation of the renter certificate completed, factory provisioning of the IHS may continue with the installation and validation of additional firmware, thus expanding the root of trust of the IHS. Additional factory provisioning may include installation of an operating system and various software applications on the IHS.

Figure 8:
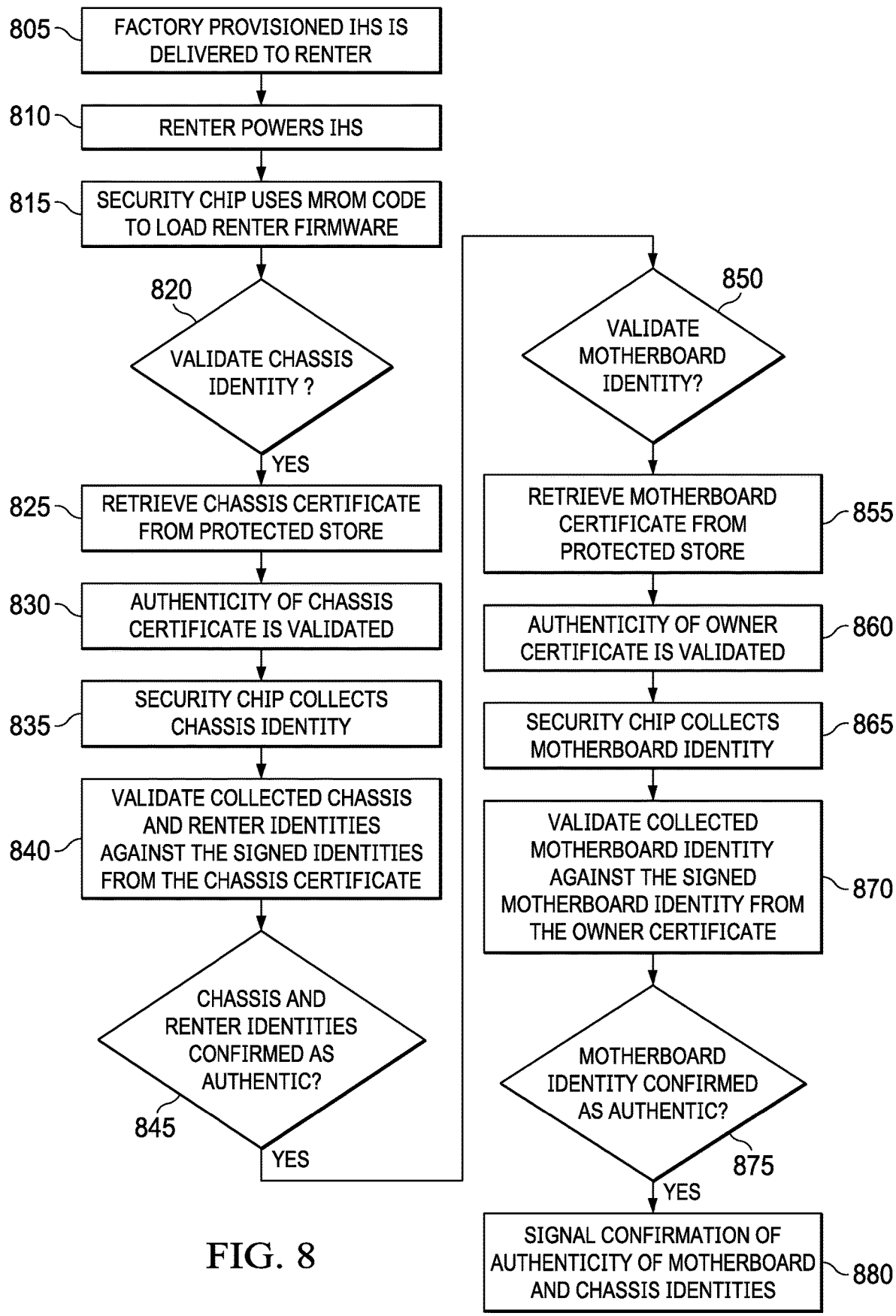
FIG. 8 is a flowchart of an example, according to some embodiments, of a method for validating the authenticity of an IHS and its components.

FIG. 8 is a flowchart of an example, according to some embodiments, of a method for validating the authenticity of an IHS and its components. Once the factory provisioning of the IHS is completed, embodiments may continue at 805, with the delivery of the IHS to a renter that will operate the IHS. At 810, the IHS is powered by the renter. In some embodiments, the procedures of FIG. 8 may be implemented each time the IHS is powered. As described, an IHS according to embodiments supports the operation of mutually exclusive boot code that allows the owner of an IHS and successive renters of the IHS to each establish their own root of trust in the hardware of the IHS. Accordingly, in preparation for a transfer of control of an IHS from the owner to a renter, the owner may configure security processor to load boot code provided by the renter upon its next initialization, thus preventing the execution of owner boot code until the renter has been evicted such that control of the IHS has been transferred back to the owner and owner boot code is executed.

In the illustrated embodiment, at 815, the MROM instructions invoked by the security processor upon its initialization determine that control of the IHS has been transferred to a renter. In such scenarios, the security processor may then utilize MROM code to retrieve firmware instructions provided by the renter. As with the firmware instructions provided by the owner, the renter firmware instructions may be validated and subsequently loaded for execution by the security processor. Once these instructions are validated, the renter firmware instructions may be loaded used to validate the authenticity of the motherboard and a chassis of the IHS as being the same motherboard and chassis from which the IHS was manufactured. Embodiments may thus continue, at 820, with the determination by the renter boot code to validate the identity of the chassis of the IHS.

The validation of the chassis identity is initiated, at 825, by the security processor retrieving the renter certificate from a protected memory, such as from a renter slot of the PROM 616 of FIG. 6. Using the renter's boot code instructions, at 830, the security processor may verify the authenticity of the retrieved renter certificate. For instance, such validation procedures may include use of the renter public key included in the renter certificate to generate a public key verification that is addressed through the security processor establishing that this public renter key corresponds to a private renter key that has been permanently stored to a one-time programmable memory, such as the PROM 616 of FIG. 6 that may be accessible solely by the security processor during boot code operations.

If the public key in the renter certificate is validated, at block 835, the security chip may continue use of renter boot code to collect the identity information for the chassis of the IHS that is being booted. As described, available chassis identifiers may include a part number associated with the chassis, a part number or other such identifier associated with a backplane or midplane installed in the chassis and/or part number or other identifier associated with the chassis management controller of the IHS. At 840, the collected identity information is validated against the chassis identity provided in the body of the renter certificate. In some embodiments, the security chip may validate the integrity of the chassis identifiers presented in the renter certificate through use of the renter public key included in the certificate to decode the signature included in the renter certificate. If the decoding of the signature produces the chassis identifiers included in the certificate, the chassis identifiers in the certificate are confirmed as authentic.

At 845, the comparison of the collected chassis identifiers against the chassis identifiers included in the renter certificate confirms that the chassis that is being booted is the same chassis from which the IHS was manufactured, such as described above. If any components of the chassis that are identified within the renter certificate do not match the chassis identifiers collected by the security processor, a compromise of the chassis may be indicated. In scenarios where the collected chassis identifiers correspond to the validated chassis identity included in the renter certificate, at 850, the renter boot code may determine whether to continue with validation of the motherboard of the IHS.

In scenarios where the motherboard will be validated, at 855, the security processor retrieves the owner certificate from a protected memory that may have availability limited to pre-boot operations, such as the PROM 616 of FIG. 6. As with the renter certificate, the validity of the owner certificate may be similarly determined based on the digital signature included in the certificate. As described with regard to FIG. 7, the owner certificate is generated and signed during factory provisioning of the IHS by a certificate authority that is supported by an HSM or other cryptographic support tool operating in the factory provisioning setting. Accordingly, the security processor may validate the authenticity of the owner certificate through a public key verification issued to the certificate authority that signed the certificate. In some embodiments, the certificate authority may operate on behalf of the manufacturer of the IHS, or on behalf of another entity that provides ongoing support for the IHS and that has been designated as an owner, such as described herein, of the IHS. If the security processor establishes that the public key in the owner certificate corresponds to a key pair controlled by the owner of the IHS, the authenticity of the owner certificate is established.

Embodiments may continue, at 865, with the validation of the motherboard identity against the identity information included in the owner certificate. The security processor may utilize the renter boot code in collecting the identity of the motherboard. As described, the motherboard identity may be implemented as a part number, model number, series number or other identifier that has been assigned to the motherboard. Also as described, the motherboard identity may additionally or alternatively be specified based on part numbers or other identifiers associated with the main processor(s) of the IHS and/or associated with the security chip.

Validation of the owner certificate may continue, at 870, with the validation of the motherboard identity information included in the certificate. For instance, the security processor may utilize the owner public key that was used to establish the authenticity of the certificate in order to decode the digital signature included in the certificate. If the decoding results match the motherboard identifiers included in the body of the certificate, the integrity of the motherboard identifiers is confirmed. If the collected motherboard identifiers match the identifiers included in the motherboard certificate, at 875, the motherboard is confirmed as having been installed during manufacture of the IHS and confirmed as configured for operation, according to the embodiments described herein, during factory provisioning of the IHS, such as described with regard to FIG. 7. Accordingly, at 880, the authenticity of the motherboard and chassis as the components that were installed in the IHS during its manufacture may be confirmed and the security processor may continue use of the renter boot code in any remaining boot procedures.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A security processor installed in an IHS (Information Handling System), the security processor comprising:
    a logic unit; and
    a memory coupled to the logic unit, the memory having program instructions stored thereon that, upon execution by the logic unit, cause the security processor to:
        as part of a factory provisioning of the IHS:
            retrieve owner boot code from a memory device that is fixed to a motherboard installed during manufacture of the IHS;
            use the retrieved owner boot code to store a signed owner certificate specifying an identity of the motherboard, wherein the owner certificate comprises a public key of an owner keypair that is derived by the retrieved owner boot code from immutable specifications of the motherboard of the IHS and is signed by a certificate authority of an owner of the IHS; and
            use the retrieved owner boot code to store a signed renter certificate specifying an identity of a chassis to which the motherboard was installed during manufacture of the IHS; and
        upon a transfer of control or ownership of the security processor:
            retrieve renter boot code from the memory device that is fixed to the motherboard; and
            use the retrieved renter boot code to validate a detected motherboard as the motherboard installed during manufacture of the IHS and to validate a detected chassis as the chassis to which the motherboard was installed during manufacture of the IHS.

2. The security processor of claim 1, wherein the signed renter certificate comprises a public key of a renter keypair that is derived by the retrieved owner boot code from immutable specifications of the chassis of the IHS.

3. The security processor of claim 2, wherein the immutable specifications of the chassis comprise a unique identifier of a memory device that is fixed to the chassis.

4. The security processor of claim 1, wherein, upon the transfer of control or ownership of the security processor, the execution of the instructions by the logic unit further causes the security processor to use the retrieved renter boot code to: identify a chassis in use by the IHS and utilize the signed renter certificate to validate that the identified chassis in use by the IHS is the same chassis to which the motherboard was installed during manufacture of the IHS.

5. The security processor of claim 1, wherein the signed renter certificate obtained during the factory provisioning of the IHS further specifies an identity of a renter of the IHS.

6. The security processor of claim 5, wherein, upon the transfer of control or ownership of the security processor, the execution of the instructions by the logic unit further causes the security processor to: identify an entity that has received the transfer of the security processor and utilize the signed renter certificate to validate that the identified entity is the renter specified during the factory provisioning of the IHS.

7. The security processor of claim 5, wherein the identity of the renter specified in the signed renter certificate comprises a name of a company that contracts for the manufacture of the IHS.

8. The security processor of claim 1, wherein, upon the transfer of control or ownership of the security processor, the execution of the instructions by the logic unit further causes the security processor to: use the retrieved renter boot code to: identify a motherboard in use by the IHS and utilize the signed owner certificate to validate that the identified motherboard in use by the IHS is the same motherboard installed during manufacture of the IHS.

9. The security processor of claim 1, wherein the immutable specifications of the motherboard comprise unique identifiers of at least one of a processor and a memory device that are each fixed to the motherboard.

10. The security processor of claim 1, wherein the renter certificate is signed by an embedded certificate authority of the security processor.

11. The security processor of claim 1, wherein the identity of the motherboard specified in the signed owner certificate comprises a part number assigned to the motherboard.

12. The security processor of claim 1, wherein the immutable specifications of the motherboard of the IHS are accessible to the owner boot code during pre-boot operations of the IHS and not accessible during post-boot operations of the IHS.

13. A memory storage device having program instructions stored thereon that, upon execution by an Information Handling System (IHS), cause the IHS to:
as part of a factory provisioning of the IHS:
retrieve owner boot code from a memory device that is fixed to a motherboard installed during manufacture of the IHS;
use the retrieved owner boot code to store a signed owner certificate specifying an identity of the motherboard, wherein the owner certificate comprises a public key of an owner keypair that is derived by the retrieved owner boot code from immutable specifications of the motherboard of the IHS and is signed by a certificate authority of an owner of the IHS; and
use the retrieved owner boot code to store a signed renter certificate specifying an identity of a chassis to which the motherboard was installed during manufacture of the IHS; and
upon a transfer of control or ownership of the IHS:
retrieve renter boot code from the memory device that is fixed to the motherboard; and
use the retrieved renter boot code to validate a detected motherboard as the motherboard installed during manufacture of the IHS and to validate a detected chassis as the chassis to which the motherboard was installed during manufacture of the IHS.

14. The memory storage device of claim 13, wherein, upon the transfer of control or ownership of the IHS, the execution of the instructions by the logic unit further causes the security processor to: use the retrieved renter boot code to identify a chassis in use by the IHS and utilize the signed renter certificate to validate that the identified chassis in use by the IHS is the same chassis to which the motherboard was installed during manufacture of the IHS.

15. The memory storage device of claim 13, wherein the signed renter certificate obtained during the factory provisioning of the IHS further specifies an identity of a renter of the IHS and wherein, upon a transfer of control or ownership of the IHS, the execution of the instructions by the logic unit further causes the security processor to: identify an entity that has received the transfer of the security processor and utilize the signed renter certificate to validate that the identified entity is the renter specified during the factory provisioning of the IHS.

16. The memory storage device of claim 13, wherein, upon a transfer of control or ownership of the IHS, the execution of the instructions by the logic unit further causes the security processor to: use the retrieved renter boot code to identify a motherboard in use by the IHS and utilize the signed owner certificate to validate that the identified motherboard in use by the IHS is the same motherboard installed during manufacture of the IHS.

17. A method for validating components of an Information Handling System (IHS), the method comprising:
as part of a factory provisioning of the IHS:
retrieving owner boot code from a memory device that is fixed to a motherboard installed during manufacture of the IHS;
using the retrieved owner boot code to generate and store a signed owner certificate specifying an identity of the motherboard, wherein the owner certificate is signed by a certificate authority of an owner of the IHS; and
using the retrieved owner boot code to generate and store a signed renter certificate specifying an identity of a chassis to which the motherboard was installed during manufacture of the IHS, wherein the renter certificate is signed by an embedded certificate authority of a security processor of the IHS, wherein the owner of the IHS maintains a restricted access to the security processor upon a transfer of control or ownership of the IHS; and
upon a transfer of control or ownership of the IHS:
retrieve renter boot code from the memory device that is fixed to the motherboard; and
use the retrieved renter boot code to validate a detected motherboard as the motherboard installed during manufacture of the IHS and to validate a detected chassis as the chassis to which the motherboard was installed during manufacture of the IHS.

18. The method of claim 17, wherein, upon the transfer of control or ownership of the IHS, the execution of the instructions by the logic unit further causes the security processor to: use the retrieved renter boot code to identify a chassis in use by the IHS and utilize the signed renter certificate to validate that the identified chassis in use by the IHS is the same chassis to which the motherboard was installed during manufacture of the IHS.

19. The method of claim 17, wherein, upon a transfer of control or ownership of the IHS, the execution of the instructions by the logic unit further causes the security processor to: use the retrieved renter boot code to identify a motherboard in use by the IHS and utilize the signed owner certificate to validate that the identified motherboard in use by the IHS is the same motherboard installed during manufacture of the IHS.

20. The method of claim 17, wherein the owner of the IHS comprises a manufacturer of the IHS.

* * * * *